C. F. PENNEWELL.
MANUFACTURE OF FERTILIZER.
APPLICATION FILED AUG. 18, 1914.

1,208,199.

Patented Dec. 12, 1916.

WITNESSES:
Charles Pickles
Thos. Eastberg

INVENTOR
Charles F. Pennewell,
BY G. H. Strong.
ATTORNEY

UNITED STATES PATENT OFFICE.

CHARLES F. PENNEWELL, OF SACRAMENTO, CALIFORNIA.

MANUFACTURE OF FERTILIZER.

1,208,199.     Specification of Letters Patent.     Patented Dec. 12, 1916.

Application filed August 18, 1914. Serial No. 857,312.

*To all whom it may concern:*

Be it known that I, CHARLES F. PENNEWELL, a citizen of the United States, residing at Sacramento, in the county of Sacramento and State of California, have invented new and useful Improvements in the Manufacture of Fertilizer, of which the following is a specification.

This invention relates to a method of manufacture of a fertilizer or top soil dressing and pertains especially to the stimulation of bacterial growth in and throughout such dressing.

The object in short is to stimulate the growth of soil bacteria and to make it commercially practicable to prepare and put upon the market an inexpensive dressing rich in fertilizing values.

The invention comprehends generally the production of the stimulated bacterial growth in a body of bacteria-laden soil by means of a carbohydrate or other known bacterial stimulant under appropriate conditions such that the stimulation may proceed rapidly, continuously and economically; usually the bacterial stimulant being mixed with stable manure and the mixture laid as a removable and renewable blanket over the bacteria-laden soil and liquid is allowed to percolate at intervals therethrough. When the soil forming the receiving medium of the bacterial growth has become suitably enriched, it is then withdrawn from the apparatus and a fresh charge of soil is placed therein, together with a fresh charge of bacterial stimulant.

Figure 1:
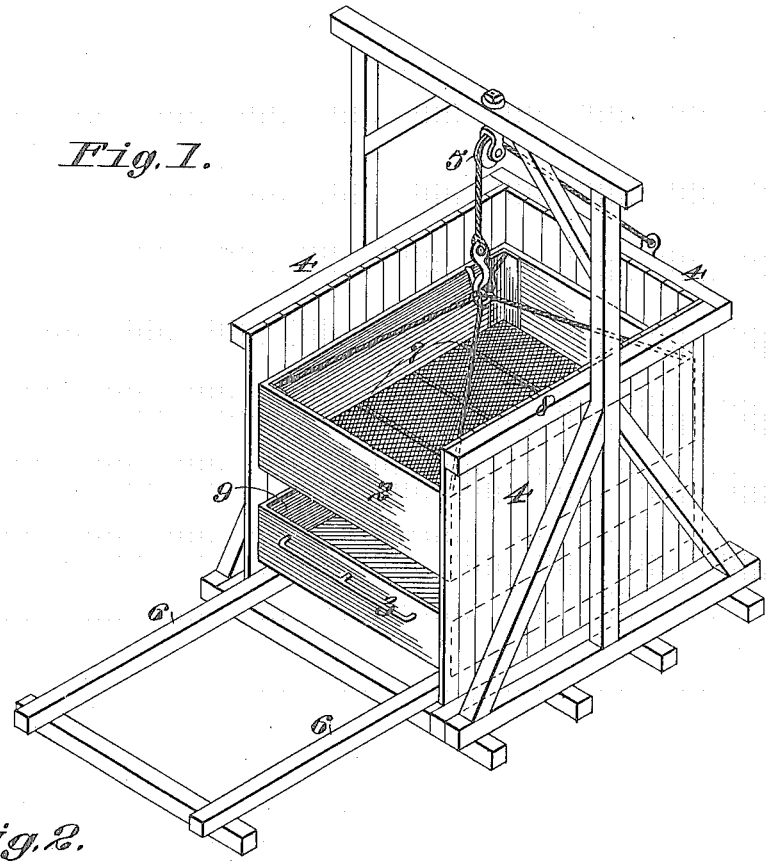
Figure 2:
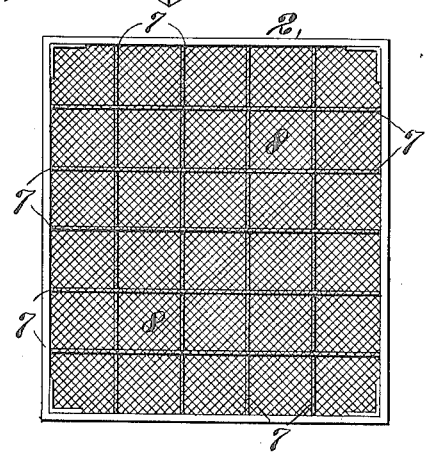

One particular method of practising my invention is exemplified in the following description and illustrated in Figure 1, which is a perspective of an apparatus suitable for carrying out the invention. Fig. 2 is a plan view of the bottom screen of the top box.

This device is known as a "fertilizing unit," and consists of an upper box 2 and a lower drawer 3 both contained within a suitable three-sided inclosure or frame 4; the upper box 2 being movable vertically toward and from the drawer 3 by suitable means, as the block and tackle 5, and the drawer 3 being movable horizontally on suitable tracks 6. The box 2 has a foraminous bottom, preferably made up of strong rods 7 extending crosswise, as shown in Fig. 2, with a suitable heavy wire screen 8 supported upon the rods 7. Ordinarily, in practice, the box 2 rests upon the drawer 3 so that the contents of the two are in close union through the screened bottom 8.

In practice, the bottom container or drawer 3 is filled with prepared soil; this prepared soil being impregnated or charged with the necessary nitrogen-producing bacteria. The upper container or box 2 is filled with stable manure, or other suitable vehicle, capable of generating the necessary heat; this manure having been impregnated with a carbohydrate, such as sugar or other saccharine material, or other soil bacteria stimulant. The box 2 is then lowered until it rests on the drawer 3 so that the only communication with the contents of the drawer 3 is through the manure blanket and its contained bacterial stimulant.

About every third day the upper box is lifted from the lower drawer, allowing the soil contents in the lower box to be stirred and aerated, after which the upper box is again dropped onto the lower box. Each third day the upper box is moistened with water; it being customary to use about two gallons of water to a ton of manure and a ton of prepared earth. The moisture filtering through the preparation carries a certain amount of the bacterial product into the lower container where it becomes fixed or available nitrogen. The steps are repeated at three day intervals for about ninety days, whereupon the apparatus may be emptied and a fresh charge inserted; the removed soil contents of the drawer 3 being then ready for use as a top dressing.

The practical value of this process has been amply demonstrated by experience. One of its chief advantages, aside from its value as a fertilizer, is its economical production in commercial quantities.

Having thus described my invention, what I claim and desire to secure by Letters Patent is—

1. A method of stimulating bacterial growth which consists in superimposing upon a container charged with bacterial growth another container containing a suitable bacterial stimulant, bringing the contents of the two containers into close union to permit filtration from the bacterial stimulant to the bacteria container, occasionally moistening the stimulating contents and allowing the moisture to filter through to the bacterial contents, and occasionally stirring the latter.

2. A method of stimulating bacterial growth which consists in superimposing upon a container charged with bacterial growth another container containing a suitable bacterial stimulant, bringing the contents of the two containers into close union to permit filtration from the bacterial stimulant to the bacteria container, occasionally moistening the stimulating contents and allowing the moisture to filter through to the bacterial contents, and occasionally stirring the latter, said moistening and stirring being carried on at intervals of approximately three days for a period approximately ninety days.

3. A method of stimulating bacterial growth which comprehends superimposing a container having a foraminous bottom charged with stable manure and a carbohydrate, upon a soil container charged with nitrogen producing bacteria and allowing moisture to filter through from one to the other.

4. A method of stimulating bacterial growth which comprehends superimposing a container having a foraminous bottom charged with stable manure and a corbohydrate, upon a soil container charged with nitrogen producing bacteria, and allowing moisture to filter through from one to the other, there being approximately two gallons of moisture producing liquid to a ton of the manure compound and a ton of the bacterial preparation.

5. A method of stimulating bacterial growth which comprehends superimposing a container having a foraminous bottom charged with stable manure and a carbohydrate, upon a soil container charged with nitrogen producing bacteria, and allowing moisture to filter through from one to the other, there being approximately two gallons of moisture producing liquid to a ton of the manure compound and a ton of the bacterial preparation, the liquid being added approximately every third day to the contents of the bacterial stimulant, the preparation in the lower container being stirred and aerated about every three days, the operation of moistening and stirring continuing approximately for ninety days.

6. The method of stimulating bacterial growth, which consists in treating soil, containing nitrogen producing bacteria, to the seepage of a manure, containing carbohydrate.

7. The method of manufacturing a fertilizer, which consists in treating soil, laden with bacteria, to the seepage of a bacterial stimulant.

In testimony whereof I have hereunto set my hand in the presence of two subscribing witnesses.

CHARLES F. PENNEWELL.

Witnesses:
JOHN H. HERRING,
W. W. HEALEY.